(12) United States Patent
Johansson et al.

(10) Patent No.: US 6,449,482 B1
(45) Date of Patent: Sep. 10, 2002

(54) CREATION OF OVERLAPPING CELLS WHEN USING MULTI CASTING

(75) Inventors: Bo Christer Vilhelm Johansson, Täby; Håkan Persson, Stockholm; Håkan Andersson, Ekerö, all of (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 08/448,854

(22) Filed: May 24, 1995

(51) Int. Cl.$^7$ ................................................. H04Q 7/20
(52) U.S. Cl. .......................... 455/443; 455/422; 455/426
(58) Field of Search .............................. 455/33.1, 33.3, 455/33.4, 53.1, 54.1, 56.1, 14, 15, 19, 33.2, 443, 422, 426, 502, 503

(56) References Cited

U.S. PATENT DOCUMENTS

| | | | |
|---|---|---|---|
| 4,597,105 A | * 6/1986 | Freeburg | 455/33.4 |
| 4,633,463 A | * 12/1986 | Mack | 455/33.4 |
| 5,487,174 A | * 1/1996 | Persson | 455/33.4 |
| 5,509,028 A | * 4/1996 | Marque-Pucheu | 455/53.1 |

FOREIGN PATENT DOCUMENTS

| | | | |
|---|---|---|---|
| DE | 42 25 582 | 2/1994 | |
| EP | 324509 | * 7/1989 | 455/33.4 |
| EP | 504 122 | 3/1992 | |
| EP | 504 122 | * 9/1992 | |
| EP | 93 19560 | * 9/1993 | |
| JP | 60-89137 | * 5/1985 | 455/33.4 |
| JP | 1-273443 | * 11/1989 | 455/33.4 |
| JP | 4-18824 | * 1/1992 | 455/33.2 |
| WO | WO93/19560 | 9/1993 | |
| WO | WO95/06369 | 2/1995 | |

OTHER PUBLICATIONS

Kerpez, K.J., "Automatic Link Transfer With Distributed Antennas," *IEEE International Conference on Communications*, Jun. 18–22, 1995, pp. 400–404.

David Cahana, "A new, single plane, double-balanced mixer," Applied MICROWAVE, pp. 78–81, Aug. 1989.*

* cited by examiner

*Primary Examiner*—Lester G. Kincaid
(74) *Attorney, Agent, or Firm*—Burns, Doane, Swecker & Mathis, L.L.P.

(57) ABSTRACT

A method and apparatus for providing handoffs in a cellular communication system is disclosed wherein cells within the communication system share at least one transceiver unit or transceiver units from different cells are placed in close proximity to each other so as to create a larger overlapping region in which mobile stations can be handed off. The shared transceiver unit is able to transmit and receive radio signals with the communication frequencies assigned to the cells sharing the transceiver unit.

32 Claims, 5 Drawing Sheets

Fig. 1

PRIOR ART

CREATION OF OVERLAPPING CELLS WHEN USING MULTI CASTING

FIELD OF THE INVENTION

The present invention relates to a cellular communication system, and more particularly to a cellular communication system, wherein neighboring cells share antennas so as to create an overlapping region which is covered by at least two cells.

BACKGROUND OF THE INVENTION

Figure 1:
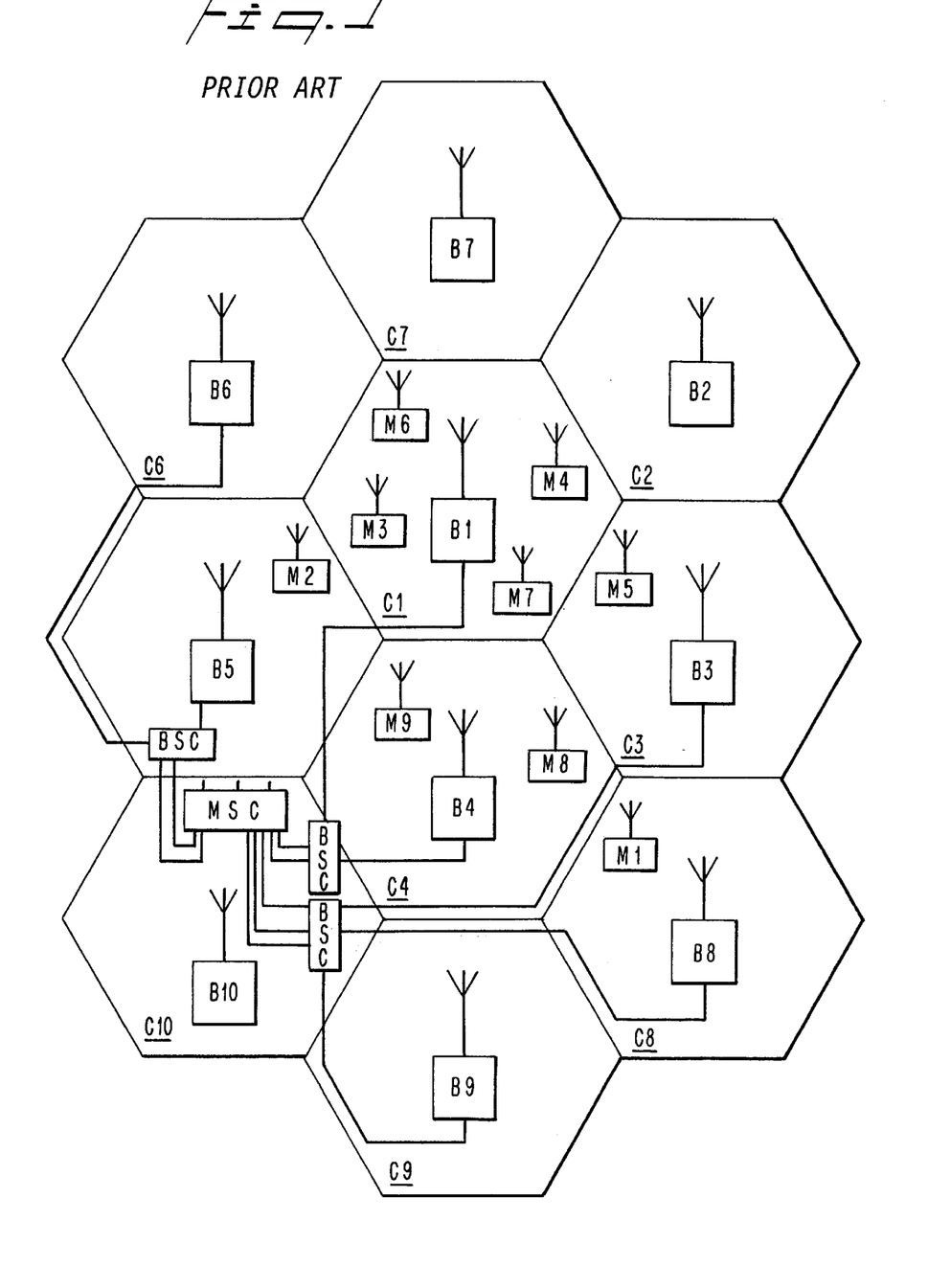
FIG. 1 illustrates a typical cellular communication system.

In a cellular mobile radio telephone system, a collection of cells or radio base stations each having a specified coverage area is controlled to provide duplex radio communications with a large number of mobile stations throughout a geographical area. A typical cellular communication system is illustrated in FIG. 1. FIG. 1 illustrates ten cells, C1–C10, in a typical cellular mobile radio communication system. Normally, a cellular mobile radio system will be implemented with more than ten cells. However, for the purposes of simplicity, the present invention can be explained using the simplified representation illustrated in Figure. 1. For each cell, C1–C10, there is a base station B1–B10, with the same reference number as a corresponding cell. FIG. 1 illustrates the base stations as situated in the vicinity of the cell center and having omni-directional antennas. The base stations could also be situated at a cell border and use directional antennas. Each of the base stations is connected to a base station controller BSC which controls some of the operations of the base station.

FIG. 1 also illustrates nine mobile stations, M1–M9 which are movable within a cell and from one cell to another. In a typical cellular radio system, there would normally be more than nine cellular mobile stations. In fact, there are typically many times the number of mobile stations as there are base stations. However, for the purposes of explaining the present invention, the reduced number of mobile stations is sufficient.

Also illustrated in FIG. 1 is a mobile services switching center MSC. The mobile services switching center MSC is connected to all of the base station controllers by cables. The mobile service switching center MSC is also connected by cables to a fixed switch telephone network or similar fixed network. All cables from the mobile services switching center MSC to the base station B1–B10 and cables to the fixed network are not illustrated.

In addition to the mobile services switching center MSC illustrated, there may be additional mobile switching centers connected by cables to base stations other than those illustrated in FIG. 1. Instead of cables, other means, for example, fixed radio links, may also be used between base stations, base station controllers and mobile services switching centers. The mobile services switching center MSC, the base stations, and the mobile stations are all computer controlled.

As noted above, cellular communication systems are built by using base stations or base transceiver stations. The mobile stations can be connected by electromagnetic radio waves to the base stations. For the cellular system to function in the desired way, it is important that mobiles can be handed off or handed over between base stations or cells. As a result, during a call, the connection between a mobile station and another party is switched from one base station to another as the mobile station travels through the system.

In order for the cellular system to be able to decide which base station a mobile station should be connected to, the mobile station and/or the cellular system performs measurements on received signals such as signal strength, path loss, etc. Either the mobile station can measure the signal strength of signals received from the base stations or the base stations can measure the signal strength of signals received from the mobile stations. Regardless of how the signal strength measurements are collected, the data is processed in a mobile services switching center or base station controller in order to decide if a handover should be performed. In some systems, delays are introduced by signalling, e.g., measurement reports and handover commands, between both the mobile stations and the base stations and between the base stations and the processing unit of the cellular system. As a result, the handover procedure must take into account the delay inherent during signal transfers and signal processing.

Figure 2:
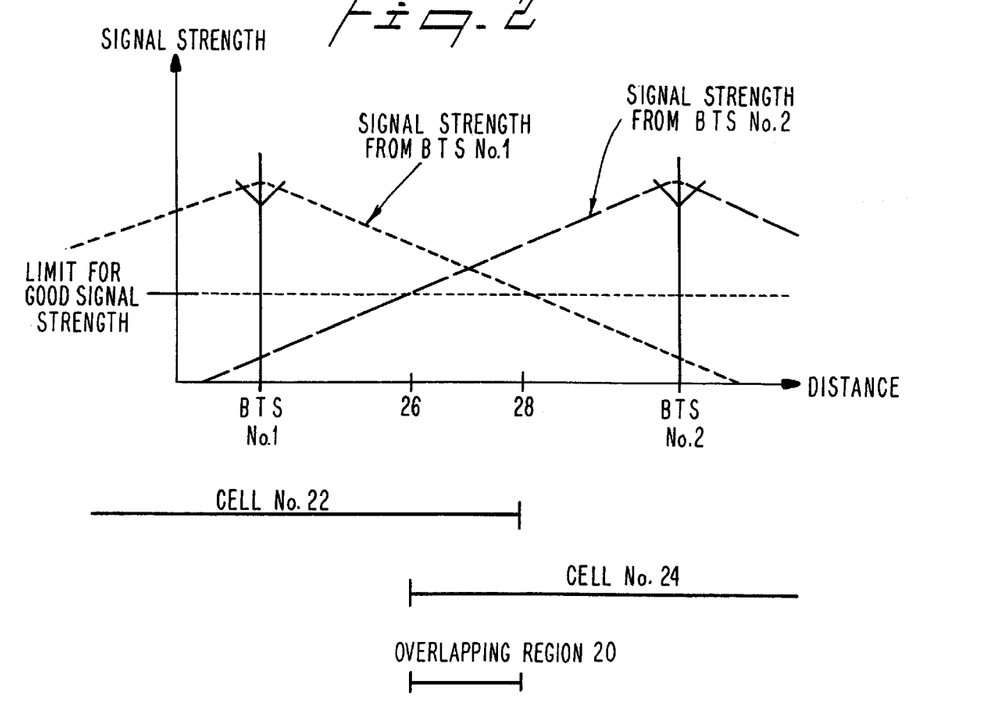
FIG. 2 illustrates an overlapping region formed by two cells.

In an attempt to provide seamless handoffs between cells, overlapping regions of coverage are created between neighboring cells. FIG. 2 illustrates an overlapping region 20 created between cell 22 and cell 24. The overlapping region is defined by points 26 and 28, which indicate where the signal strength of cells 22 and 24, respectively, falls below a predetermined level. However, the overlapping region between cells is sometimes very small. This can be because the radio signal strength from the base station that the mobile station is connected to drops off quickly when the mobile moves away from the base station. In addition, the signal strength from the base station that a mobile station should change to may raise very fast when the mobile station is travelling toward the base station. This phenomena can occur when a mobile station which is in line of sight with its current base station moves around a street corner and is now in line of sight with a new base station. Another example is when a mobile station moves through a tunnel wherein the regions on either side of the tunnel are connected to different base stations. A third example is when a hand held mobile is carried through a door into an office building which has its own cellular system. The common problem in all of the above examples is that the overlapping regions between the cells is so small that when the mobile moves through the overlapping region before the call can be handed over because of the time delays described above with respect to signalling and signal processing are too large. As a result, the call will be lost.

Prior art systems have attempted to improve the speed in which a hand off takes place by reducing the number of neighbors a mobile station measures and by using short filters. However, taking these actions may have a bad influence on the overall performance of the system, since using too few neighbors may forbid a handover between cells for which a handover should be allowed and too short a filter may cause handovers that should not be performed in the first place. Thus, there is a need in the industry to improve the handoff capabilities of a cellular system.

SUMMARY OF THE INVENTION

It is an object of the present invention to overcome the problems cited above, by providing a cellular communication system wherein cells within the communication system share at least one transceiver unit or have transceivers placed in close proximity to each other so as to create a larger overlapping region in which mobile stations can be handed off. According to one embodiment of the present invention, the cellular communication system comprises a plurality of cells wherein each cell is assigned a communication frequency and contains a plurality of transceiver units and at least one base station for transmitting and receiving radio signals on the assigned frequency. Neighboring cells in the system share at least one transceiver unit to create an overlapping region wherein the shared transceiver unit is able to transmit and receive radio signals with the communication frequencies of the cells sharing the transceiver unit.

According to another embodiment of the present invention, a method for handing over a call in a cellular system is disclosed, wherein neighboring cells within the communication system share at least one transceiver means to create an overlapping region. Each mobile station receives a list of frequencies used by neighboring cells. Each transceiver means within each cell periodically broadcasts a base station identification code which is unique for each cell within the cellular system. However, the shared transceiver means broadcasts the identification codes for the cells sharing the transceiver means. The mobile stations within the cellular system periodically measure the signal strength of signals received from neighboring cells and then decode any identification codes they receive. The mobile stations then report any decoded information codes and the signal strength measurements for the neighboring cell identified by the decoded identification code to a base station controller. The base station controller then determines when a mobile station should be handed off to a second cell based upon the signal strength measurements.

According to another embodiment of the present invention, a method for handing over a call in a cellular communication system is disclosed. The cellular system is divided into a plurality of cells, each cell having a plurality of transceiver means, wherein neighboring cells share at least one of said transceiver means to create an overlapping region. The shared transceiver means is able to transmit and receive radio signals on frequencies assigned to the cells sharing the transceiver means. According to the present invention, control signals are periodically broadcast from each transceiver means within each cell, wherein the shared transceiver means broadcast control signals of the cells sharing the transceiver means. The signal strength of control signals received at a mobile station are then measured and reported to a base station controller. A determination is then made as to whether mobile station should be handed off to a second cell based on the signal strength measurements.

According to another embodiment of the present invention, a method for handing over a call in a cellular communication system is disclosed. Control signals are periodically broadcast from each transceiver means within each cell, wherein shared transceiver means broadcast control signals of the cells sharing the transceiver means. The signal strength of control signals received at a mobile station are measured and evaluated to determine whether the mobile station should be handed off to a second cell using a handover algorithm and the signal strength measurements at the mobile station. A handover request can then be made to a base station controller based upon the evaluation. The base station controller then determines whether the handover request should be granted based upon system information and hands over the mobile station to the second cell when the handover request is granted.

BRIEF DESCRIPTION OF THE DRAWINGS

These and other features and advantages of the invention will be readily apparent to one of ordinary skill in the art from the following written description, used in conjunction with the drawings, in which.

DETAILED DESCRIPTION

According to one embodiment of the present invention, a cellular communication system is divided into a plurality of cells wherein each cell contains a plurality of distributed transceivers, i.e., a plurality of antennas for transmitting and receiving signals to/from a plurality of mobile stations. Distributed antennas means that the same radio signal is transmitted on several antennas to cover the cell. This gives coverage and reduces interference since a low transmitting power can be used. Therefore, a very dense frequency plan can be used.

Figure 3:
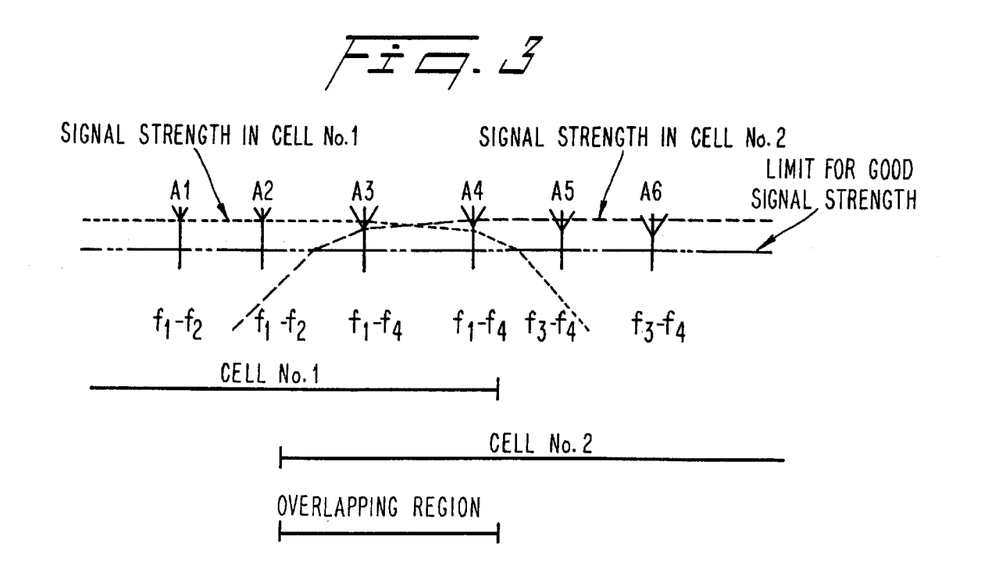
FIG. 3 illustrates a communication system according to one embodiment of the present invention.

According to one embodiment of the present invention, neighboring cells share at least one of the transceiver units in order to create an overlapping region as is illustrated in FIG. 3. It will be appreciated by one skilled in the art that each cell could be assigned one frequency or a plurality of frequencies to operate on. In this example, the transceiver units A1–A4 belong to cell 1 and use frequencies f1–f2, wherein frequency f1 is used on the uplink and frequency f2 is used on the downlink. The transceiver units A3–A6 belong to cell 2 and use frequencies f3–f4. In this way, an overlapping area covered by both cell 1 and cell 2 is created. The size of the overlapping area can be designed to be arbitrarily large by letting as many transceiver units as desired transmit and receive on all the frequencies f1–f4. In this way, a secure handover can be guaranteed. In order to trigger a handover, transceiver units can have different transmission powers for transmitted signals and received signals can be treated differently when being processed, i.e., the signal strength of some of the received signals can be lowered or offset by an offset value, depending upon where within the cell the transceiver units are located. For example, the power of the transmitted signal and/or amplification of the received signal can be slightly reduced for transceivers near cell borders. As illustrated in FIG. 3, signals broadcast on frequency f4 at the transceiver unit A3 and signals broadcast on frequency f2 at the transceiver unit A4 could be transmitted with a slightly reduced power. A more detailed description of the handover procedure according to one embodiment of the present invention is described below.

Figure 4:
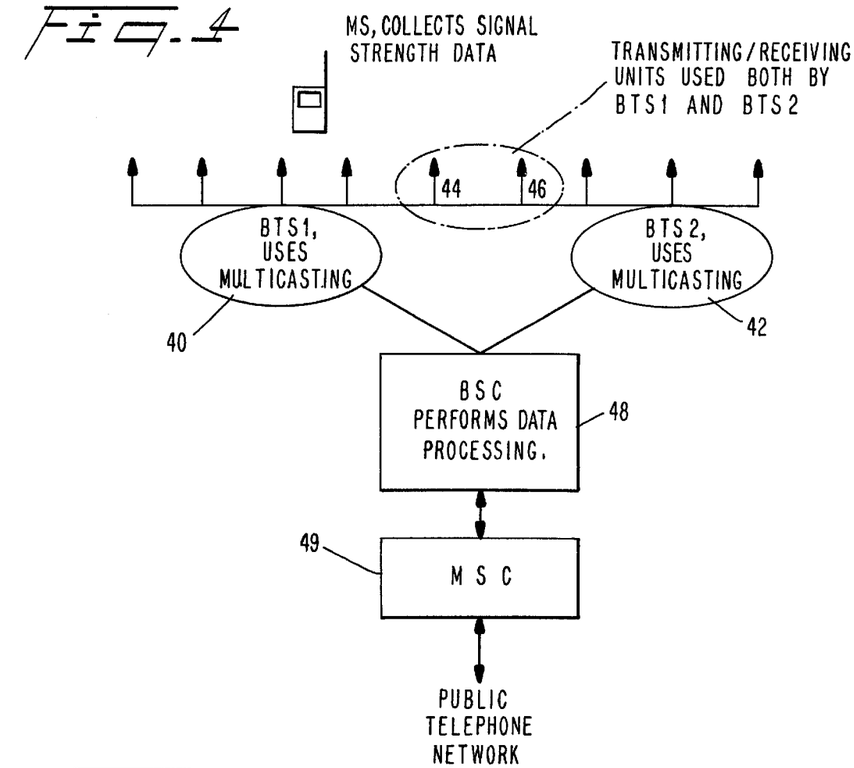
FIG. 4 illustrates a GSM system according to one embodiment of the present invention.

FIG. 4 illustrates a GSM system incorporating one embodiment of the present invention. It will be obvious to one of ordinary skill in the art that the present invention is not limited to use in a GSM system but rather applies to all types of communication systems. As illustrated in FIG. 4, a base transceiver station 40 and a base transceiver station 42 each control a plurality of antennas. In this example, the base transceiver station 40 and the base transceiver station 42 share two antennas 44 and 46. As a result, the two antennas will transmit and receive on the frequencies used by both the first transceiver station 40 and the second base transceiver station 42. The base transceiver stations are tied to a base station controller 48 which in turn is connected to a mobile services switching center 49 that connects the base stations to the public telephone network.

Figure 5:
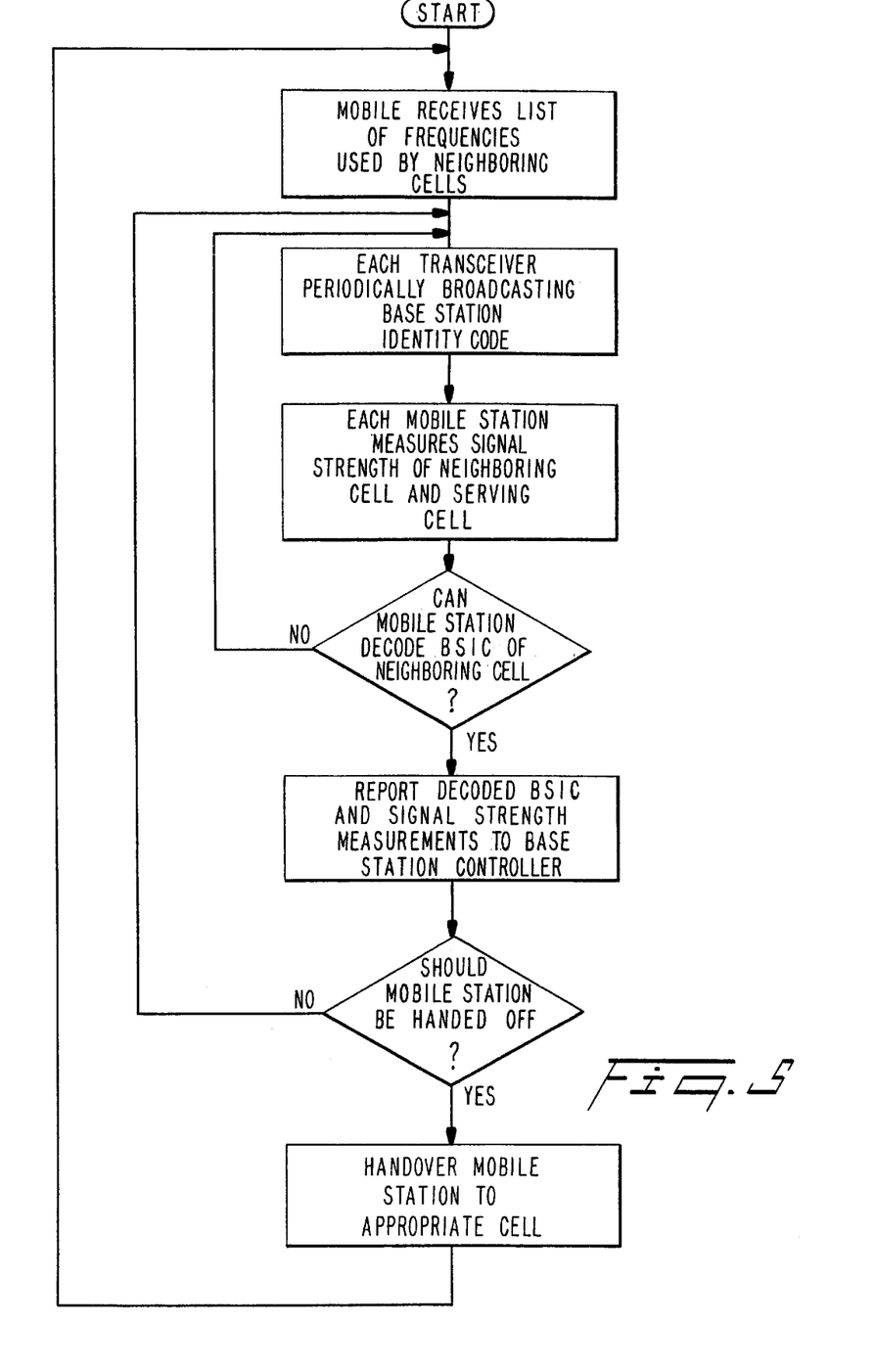
FIG. 5 illustrates a flow chart describing a handover method according to one embodiment of the present invention.

The operation of one embodiment of the present invention will now be described with reference to FIGS. 4 and 5. In FIG. 4, a mobile station 50 is operating in cell 1 and is in communication with the base transceiver station 40. During operation, the mobile station 50 receives a list of broadcast control channel frequencies for neighboring cells. Each transceiver unit in a cell periodically broadcasts a base station identification code (BSIC) on the broadcast control channel. The mobile station 50 periodically measures the signal strength of signals broadcast from the neighboring cells as well as the signal strength of signals broadcast from the base station currently serving the mobile station. When the mobile station can decode the base station identity code for one of the neighboring cells, the mobile station reports the decoded BSIC and the signal strength measurements for the cell identified by the decoded BSIC as well as the signal strength measurements of the serving base station to the base station controller 48 on a slow associated control channel. The base station controller 48 then determines whether the mobile station should be handed off to another cell.

As illustrated in FIG. 4, when the mobile station 50 moves in a direction toward the base transceiver station 42, the mobile station will come into range of the base transceiver station 42 and will be able to detect the BSIC for the base transceiver station 42. Since the base transceiver station 40 and 42 are sharing antennas 44 and 46, the mobile station 50 will detect the BSIC for the base transceiver station 42 faster, allowing the system more time to make a handoff. Once the mobile station 50 has decoded the BSIC for the base transceiver station 42, the mobile station 50 reports the decoded identification code to the base station controller 48. The base transceiver station 40 receives the measurement reports and in turn passes the measurements onto the base station controller 48. The base station controller 48 filters the signal levels received from the base transceiver stations 40 and 42 and decides whether a handover should be performed or not. It will be understood by one skilled in the art that various known methods for determining when a handover should occur can be used in the present invention. When the network determines that a handover should be performed, the BSC sends a handover command message on the downlink fast associated control channel through the base transceiver station 40 to the mobile station 50. This message contains information on which cell the mobile station should access and which frequency and time slot to use for the new traffic channel. The message also specifies if and also what type of synchronized handover the mobile station should perform. In addition, the base station controller also sends a message to the base transceiver station 42 informing the base transceiving station 42 that it should start listening for the mobile station 50. When the mobile station 50 receives the handover command, the mobile station 50 starts transmitting on the frequency assigned to the base transceiver station 42.

In an alternative embodiment of the present invention, the base transceiver stations could make the signal strength measurements on the signals broadcast by the mobile station 50. The base transceiver stations then transmit the signal strength values to the base station controller 48. The base station controller 48 filters the signal levels received from the base transceiver stations 40 and 42 and decides whether a handover should be performed or not.

According to the present invention, the size of the overlapping area is designed so that a secure handover can be performed. This means that during the time the mobile moves through the overlapping region, the mobile must be able to decode and report the BSIC, make signal strength measurements and send the signal strength measurement reports to the base station controller, and the base station controller must determine whether handoff should be performed and send the handover command to the base transceiver station 1 which in turn must send the handover command to the mobile station. By sharing transceiver units or antennas, the overlapping area can be made as large as necessary to ensure that handoffs can be performed within the time it takes a mobile station to move through the overlapping region.

Figure 6:
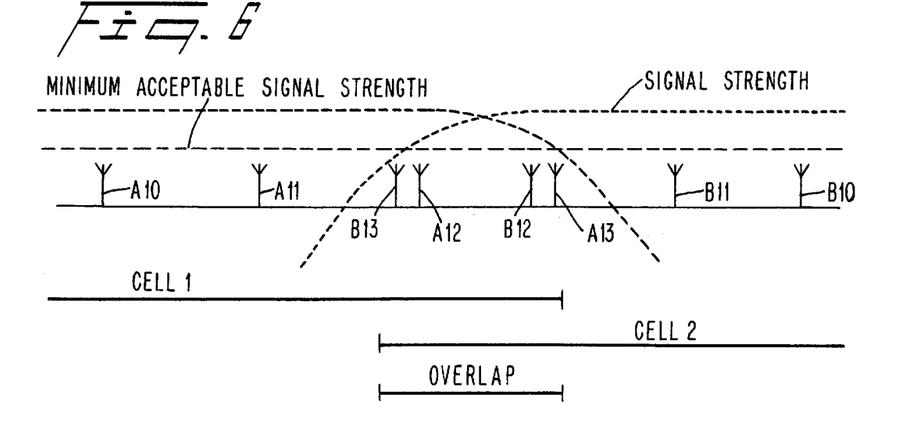
FIG. 6 illustrates a communication system according to one embodiment of the present invention.

According to another embodiment of the present invention, an overlapping region can be created between neighboring cells by placing some transceiver units of one cell in close proximity to transceiver units of the neighboring cell. This embodiment is illustrated in FIG. 6. In this example, cell 1 contains four transceiver units A10–A13 which transmit signals on frequencies f1–f2 and cell 2 contains four transceiver units B10–B13 which transmit signals on frequencies f3–f4. The two cells overlap their areas of coverage by placing transceiver units from one cell in close proximity to transceiver units of other cells. It will be appreciated that the overlapping area can be made larger by placing more transceiver units from one cell in close proximity to transceiver units in the other cell. As in the previous embodiment, as the mobile station moves toward the second cell, the mobile station will detect the BSIC of the second cell from signals broadcast from the transceiver units of the second cell located in the overlapping region (B12 and B13). As a result, the system has more time to complete the handover procedure, if necessary, before the mobile station moves out of range of cell 1 and the call is lost.

According to another embodiment of the present invention, each mobile station can take a more active roll in the handoff determination. For example, each mobile station can be assigned a handover algorithm which can be used to determine if a handover should be requested, as will be explained below with reference to FIG. 7. In this embodiment, each mobile station receives a list of broadcast control channel frequencies used by neighboring cells. Each transceiver unit in a cell periodically broadcasts control signals on the broadcast control channel. It will be appreciated by one skilled in the art that the present embodiment applies to cellular systems wherein cells share transceiver units or are located in close proximity to each other, but is not limited hereto.

Figure 7:
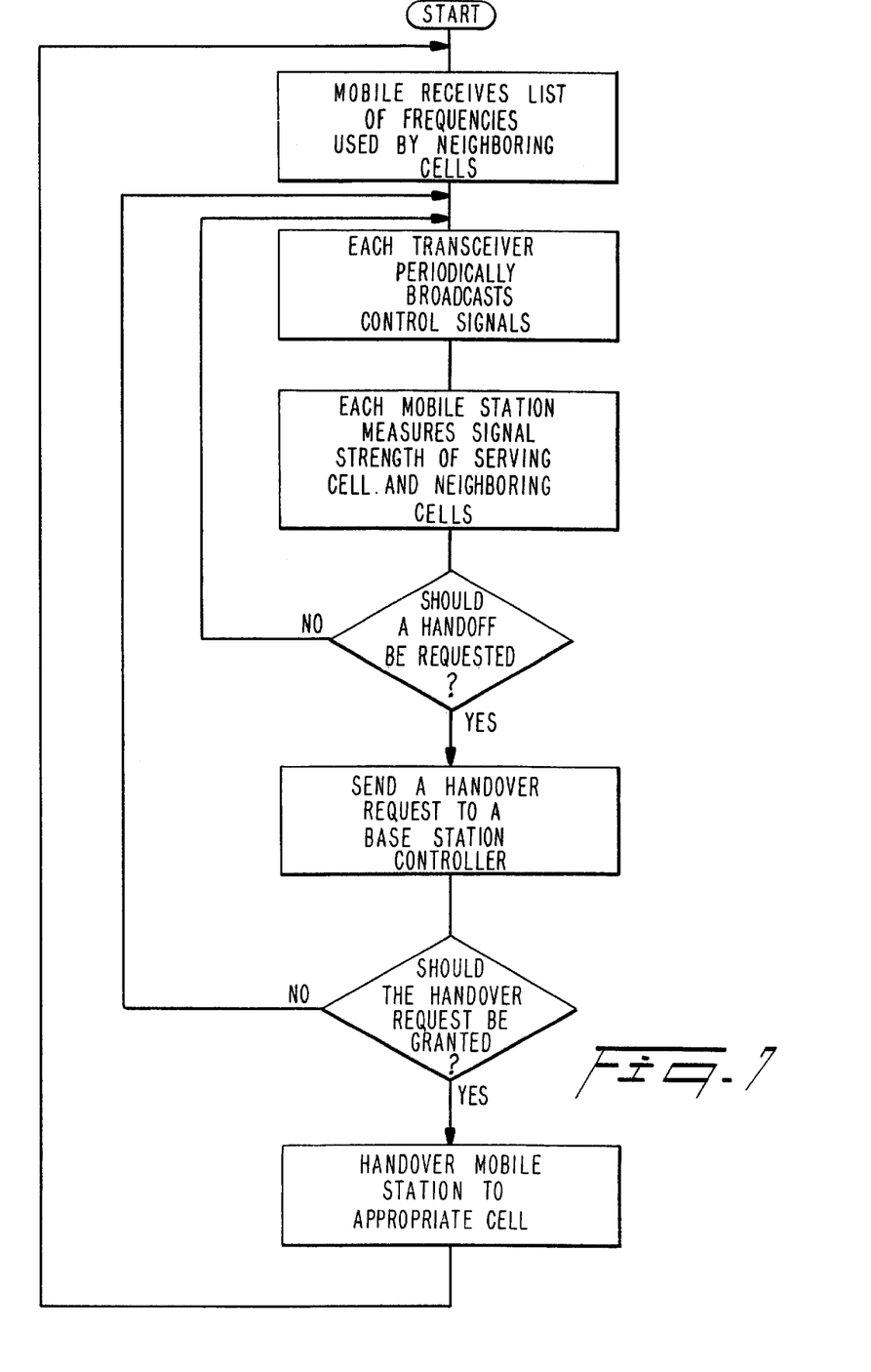
FIG. 7 illustrates a flow chart describing a handover method according to one embodiment of the present invention.

The mobile station periodically measures the signal strength of signals broadcast from the neighboring cells as well as the signal strength of signals broadcast from the base station currently serving the mobile station. The mobile station then evaluates the signal strength measurements using a handover algorithm to determine if a handover should be requested. For example, the mobile station may request a handover when the mobile station determines that a neighboring cell has a stronger signal strength than the signal strength of the serving cell or a signal strength which is stronger by a predetermined amount than the signal strength of the serving cell. If the mobile station determines that a handover should be requested, the mobile station sends a handover request to a base station controller. The base station controller then determines whether the handover request should be granted based upon system information. System information can include and is not limited to information regarding the type and available capacity of the neighboring cell and/or the signal strength measurements made by the requesting mobile station. If the base station controller decides that a handover should be made, the mobile station is handed off to the appropriate cell in a known manner. However, if the handover is not going to be granted, the base station controller can either ignore the handover request or send a signal to the requesting mobile station informing the mobile station that the handover request has been denied.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the present invention is indicated by the appended claims rather than the foregoing description, and all changes which come within the meaning and range of equivalents are intended to be embraced therein.

We claim:

1. A mobile telecommunication system comprising:
   a plurality of cells, each cell being assigned at least one communication frequency containing a plurality of transceiver units and at least one base station for transmitting and receiving radio signals on said at least one frequency, wherein neighboring cells share at least one transceiver unit to create an overlapping region, said shared transceiver unit being able to transmit and receive radio signals on communication frequencies assigned to the cells which are sharing the shared transceiver unit; and
   at least one base station controller for controlling the operation of said base stations and connecting said mobile telecommunication system to another communication system.

2. A mobile telecommunication system according to claim 1, wherein transceiver units in different regions of a cell transmit signals using different transmission powers.

3. A mobile telecommunication system according to claim 2, wherein transceiver units located near a cell border transmit signals using a lower transmission power than other transceiver units in the cell.

4. A mobile telecommunication system according to claim 1, wherein transceiver units in different regions offset the signal strength of received signals by an offset value.

5. A mobile telecommunication system according to claim 4, wherein transceiver units located near a cell border subtract the offset value from the signal strength of received signals.

6. A method for handing over a call in a mobile telecommunication system, said mobile telecommunication system being divided into a plurality of cells, each cell having a plurality of transceiver means, wherein neighboring cells share at least one of said transceiver means to create an overlapping region, said shared transceiver means being able to transmit and receive radio signals on frequencies assigned to the cells sharing the transceiver means, said method comprising the steps of:
   receiving at a mobile station a list of frequencies used by neighboring cell;
   periodically broadcasting from each transceiver means within each cell a base station identification code which is unique for each cell within a defined area, wherein said shared transceiver means broadcasts the identification codes for the cells sharing the transceiver means;
   measuring signal strength of signals received from neighboring cells at the mobile station;
   decoding said base station identification codes at the mobile station;
   reporting any decoded identification codes and signal strength measurements for a neighboring cell identified by the decoded base station identification code to a base station controller;
   determining when the mobile station should be handed over to a second cell based on said signal strength measurements; and
   handing over the mobile station to said second cell.

7. A method according to claim 6, wherein transceiver means in different regions of a cell transmit signal using different transmission powers.

8. A method according to claim 7, wherein transceiver means located near a cell border transmit signals using a lower transmission power than other transceiver means in the cell.

9. A mobile telecommunication system comprising:
   a plurality of cells, each cell being assigned at least one communication frequency and containing a plurality of transceiver units and at least one base station for transmitting and receiving radio signals on said at least one frequency to a plurality of mobile stations, wherein at least one transceiver units of a first cell is placed in close proximity to at least one transceiver units of a neighboring cell to create an overlapping region; and
   at least one base station controller for controlling the operation of said base stations in connecting said mobile telecommunication system to another communication system.

10. A mobile telecommunication system according to claim 9, wherein transceiver units in different regions of a cell transmit signals using different transmission powers.

11. A mobile telecommunication system according to claim 10, wherein transceiver units located near a cell border transmit signals using a lower transmission power than other transceiver units in the cell.

12. A mobile telecommunication system according to claim 9, wherein transceiver units in different regions offset the signal strength of received signals by an offset value.

13. A mobile telecommunication system according to claim 12, wherein transceiver units located near a cell border subtract the offset value from the signal strength of received signals.

14. A method for handing over a call in a mobile telecommunication system, said cellular system being divided into a plurality of cells, each cell having a plurality of transceiver means, wherein at least one transceiver means of a first cell is placed in close proximity to at least one transceiver means of a neighboring cell to create an overlapping region, said method comprising the steps of:
   receiving at a mobile station a list of frequencies used by neighboring cells;
   broadcasting from each transceiver means within each cell a base station identification code which is unique for each cell within a defined area;
   measuring signal strength of signals received from neighboring cells at the mobile station;
   decoding said base station identification codes at the mobile station;
   reporting any decoded identification codes and signal strength measurements for a neighboring cell identified by the decoded base station identification code to a base station controller;
   determining when the mobile station should be handed over to a second cell based on said signal strength measurements; and
   handing over the mobile station to said second cell.

15. A method according to claim 14, wherein transceiver means in different regions of a cell transmit signals using different transmission powers.

16. A method according to claim 15, wherein transceiver means located near a cell border transmit signals using a lower transmission power than other transceiver means in the cell.

17. A method for handing over a call in a mobile telecommunication system, said mobile telecommunication system being divided into a plurality of cells, each cell having a plurality of transceiver means, wherein neighboring cells share at least one of said transceiver means to create an overlapping region, said shared transceiver means being able to transmit and receive radio signals on frequencies assigned to the cells sharing the transceiver means, said method comprising the steps of:

periodically broadcasting control signals from each transceiver means within each cell, wherein said shared transceiver means broadcast control signals of the cells sharing the transceiver means;

measuring signal strength of control signals received at a mobile station;

reporting said signal strength measurements to a base station controller;

determining when the mobile station should be handed off to a second cell based on the signal strength measurements; and     handing over the mobile station to the second cell.

18. A method according to claim 17, wherein transceiver means in different regions of a cell transmit signals using different transmission powers.

19. A method according to claim 18, wherein transceiver means located near a cell border transmit signals using a lower transmission power than other transceiver means in the cell.

20. A method for handing over a call in a mobile telecommunication system, said mobile telecommunication system being divided into a plurality of cells, each cell having a plurality of transceiver means, wherein at least one transceiver means of a first cell is placed in close proximity to at least one transceiver means of a neighboring cell to create an overlapping region, said method comprising the steps of:

periodically broadcasting control signals from each transceiver means within each cell;

measuring signal strength of control signals received at a mobile station;

reporting said signal strength measurements to a base station controller;

determining when the mobile station should be handed off to a second cell based on the signal strength measurements; and     handing over the mobile station to the second cell.

21. A method according to claim 20, wherein transceiver means in different regions of a cell transmit signals using different transmission powers.

22. A method according to claim 21, wherein transceiver means located near a cell border transmit signals using a lower transmission power than other transceiver means in the cell.

23. A method for handing over a call in a mobile telecommunication system, said mobile telecommunication system being divided into a plurality of cells, each cell having a plurality of transceiver means, wherein neighboring cells share at least one of said transceiver means to create an overlapping region, said shared transceiver means being able to transmit and receive radio signals on frequencies assigned to the cells sharing the transceiver means, said method comprising the steps of:

periodically broadcasting control signals from each transceiver means within each cell, wherein said shared transceiver means broadcast control signals of the cells sharing the transceiver means;

measuring signal strength of control signals received at a mobile station;

evaluating whether the mobile station should be handed off to a second cell using a handover algorithm and said signal strength measurements at said mobile station;

reporting a handover request to a base station controller based upon said evaluation;

determining whether the handover request should be granted based upon system information; and     handing over the mobile station to the second cell when the handover request is granted.

24. A method according to claim 23, wherein system information comprises the type and capacity of the second cell to handle the call.

25. A method according to claim 24, wherein said signal strength measurements are reported to the base station controller with said handover request.

26. A method according to claim 24, wherein transceiver means in different regions of a cell transmit signals using different transmission powers.

27. A method according to claim 24, wherein transceiver means located near a cell border transmit signals using a lower transmission power than other transceiver means in the cell.

28. A method for handing over a call in a mobile telecommunication system, said mobile telecommunication system being divided into a plurality of cells, each cell having a plurality of transceiver means, wherein at least one transceiver means of a first cell is placed in close proximity to at least one transceiver means of a neighboring cell to create an overlapping region, said method comprising the steps of:

periodically broadcasting control signals from each transceiver means within each cell;

measuring signal strength of control signals received at a mobile station;

evaluating whether the mobile station should be handed off to a second cell using a handover algorithm and said signal strength measurements at said mobile station;

reporting a handover request to a base station controller based upon said evaluation;

determining whether the handover request should be granted based upon system information; and     handing over the mobile station to the second cell when the handover request is granted.

29. A method according to claim 28, wherein system information comprises the type and capacity of the second cell to handle the call.

30. A method according to claim 28, wherein said signal strength measurements are reported to the base station controller with said handover request.

31. A method according to claim 28, wherein transceiver means in different regions offset the signal strength of received signals by an offset value.

32. A method according to claim 28, wherein transceiver means located near a cell border subtract the offset value from the signal strength of received signals.

* * * * *